United States Patent [19]
Buisman

[11] Patent Number: 5,637,220
[45] Date of Patent: Jun. 10, 1997

[54] PROCESS FOR PURIFYING SULPHIDE-CONTAINING WASTE WATER

[75] Inventor: Cees J. N. Buisman, Harich, Netherlands

[73] Assignee: Paques B.V., Balk, Netherlands

[21] Appl. No.: 556,900

[22] PCT Filed: Jun. 9, 1994

[86] PCT No.: PCT/NL94/00132

§ 371 Date: Nov. 29, 1995

§ 102(e) Date: Nov. 29, 1995

[87] PCT Pub. No.: WO94/29227

PCT Pub. Date: Dec. 22, 1994

[30] Foreign Application Priority Data

Jun. 10, 1993 [NL] Netherlands ............... 9301000

[51] Int. Cl.$^6$ ................................................. C02F 3/34
[52] U.S. Cl. ..................... 210/605; 210/610; 210/616; 210/626
[58] Field of Search ......................... 210/605, 610, 210/615, 616, 617, 618, 626, 629

[56] References Cited

U.S. PATENT DOCUMENTS

| | | | |
|---|---|---|---|
| 4,384,956 | 5/1983 | Mulder | 210/631 |
| 4,584,271 | 4/1986 | Stern et al. | 210/616 |
| 4,966,704 | 10/1990 | Särner | 210/617 |
| 5,366,633 | 11/1994 | Buisman | 210/615 |

FOREIGN PATENT DOCUMENTS

| | | |
|---|---|---|
| 0 224 889 | 6/1987 | European Pat. Off. |
| 55-129191 | 10/1980 | Japan |
| WO91/16269 | 10/1991 | WIPO |
| WO92/10270 | 6/1992 | WIPO |

Primary Examiner—Christopher Upton
Attorney, Agent, or Firm—Young & Thompson

[57] ABSTRACT

A process for purifying waste water containing sulphide, comprises oxidizing the sulphide to elemental sulphur in a reactor with sulphide-oxidizing bacteria in the presence of oxygen, and separating from the waste water at least a part of the sulphur formed during the oxidation, while recycling a part of the elemental sulphur separated from the reactor effluent into the reactor in such a way that a concentration of elemental sulphur of at least 1 g/l is maintained in the reactor. The sulphur, in the form of aggregates, is used as a carrier material for the sulphide-oxidizing bacteria.

11 Claims, 3 Drawing Sheets

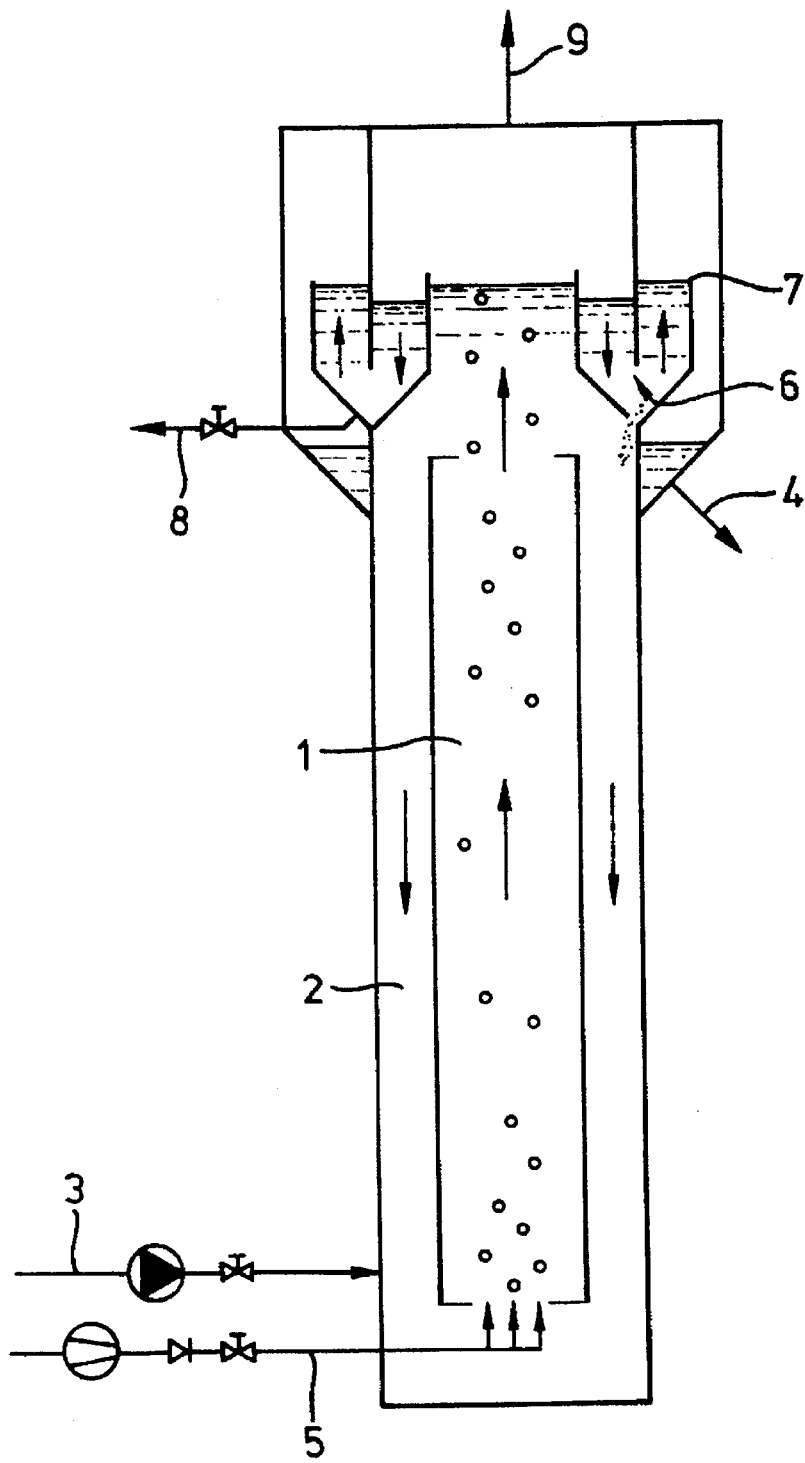

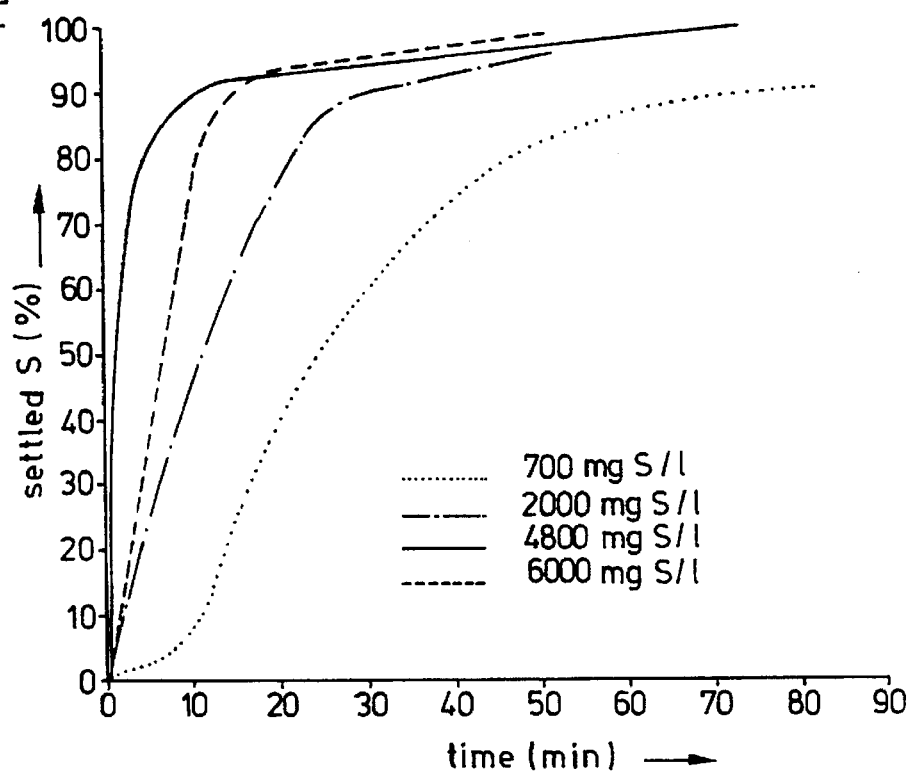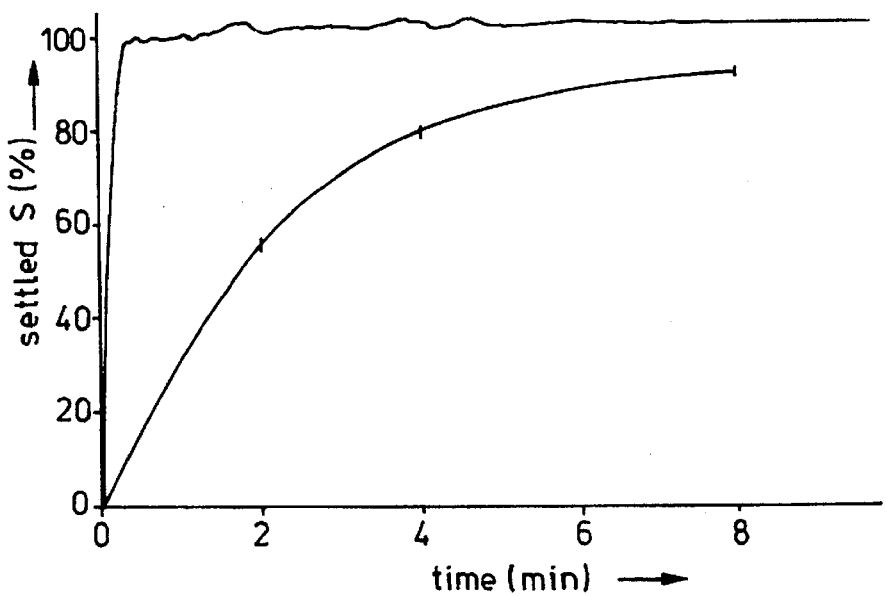

PROCESS FOR PURIFYING SULPHIDE-CONTAINING WASTE WATER

FIELD OF THE INVENTION

The invention relates to a process for purifying waste water containing sulphide, comprising oxidizing the sulphide to elemental sulphur in a reactor with sulphide-oxidizing bacteria in the presence of oxygen, and separating from the waste water at least a part of the sulphur formed during the oxidation.

BACKGROUND OF THE INVENTION

Such a process is disclosed for example in International patent application WO 91/16269. According to that process, a minimum ratio between sulphide and biomass is used.

International patent application WO 92/10270 discloses a cyclic process for the removal of sulphur compounds from a gaseous effluent wherein an aqueous solution is alternately contacted with the gaseous effluent and subjected to sulphur-oxidizing bacteria. Elemental sulphur formed by the bacterial oxidation is separated off from the aqueous solution, in such a way that 0.1 to 50 g of elemental sulphur per l is left in the recycled aqueous solution.

All known processes for bacterial waste water treatment are faced with the problem of keeping the bacteria inside the reactor. This problem is usually solved by using a carrier material for the bacteria. Two types of carriers are generally proposed: (1) mobile carriers such as pumice; however, a disadvantage of mobile carriers is that a vigorous turbulence or fluidization must be maintained in order to keep them mixed with the waste water to be treated, and, furthermore, a part of the mobile carrier will interfere with the sulphur formed, which is detrimental for the quality of the sulphur; (2) fixed carriers such as structures of synthetic material; they have a disadvantage that these fixed carriers get clogged up quickly. Moreover, both the conventional mobile carriers and the conventional fixed carriers considerably increase the cost for operating the treatment plant.

SUMMARY OF THE INVENTION

It has been found now that the problems associated with the use of a carrier material can be solved by providing a process wherein a part of the elemental sulphur separated form the treated waste water is recycled into the reactor, in such a way that a concentration of elemental sulphur of at least 1 g/l is maintained in the reactor.

Preferably, the amount of separated elemental sulphur is recycled to the aerobic reactor is such that a sulphur concentration of at least 2 g/l, in particular at least 3 g/l, and more in particular at least 4 g/l is provided. It was found that the sulphur produced by the microbial oxidation settles more quickly at these high sulphur concentrations, so that a more effective separation of sulphur and liquid effluent can be achieved by using the same type of settler.

It was shown furthermore that at the high sulphur concentration the sulphide-oxidizing bacteria can become attached to the sulphur formed in such a way that an effective biomass-carrier system is obtained which renders the use of a separate carrier material unnecessary.

In the process according to the invention, sulphur aggregates are therefore preferably used as a carrier material for sulphide-oxidising bacteria. Sulphur aggregates are understood to be sulphur particles having a diameter which is considerably larger than the size of about 1 µm occurring in sulphur sols. The sulphur aggregates preferably have a diameter of at least 50 µm. These sulphur aggregates are formed when the sulphur concentration is sufficiently high; alternatively, sulphur aggregates may be added as such at the start of the biological sulphide removal.

Advantageously, a reactor is used which is provided with an internal settler, so as to separate the biomass and at least a part of the sulphur from the liquid effluent in the reactor.

BRIEF DESCRIPTION OF THE DRAWINGS

FIG. 1 depicts a so-called airlift-loop reactor having an internal settler;

FIG. 2 shows the settling profile of a sample taken from the reactor as a function of the sulphur concentration;

FIG. 3 shows a comparison of the settling profile of a sample taken from an airlift-loop reactor and from a mixed reactor.

DETAILED DESCRIPTION OF THE INVENTION

Figure 4:
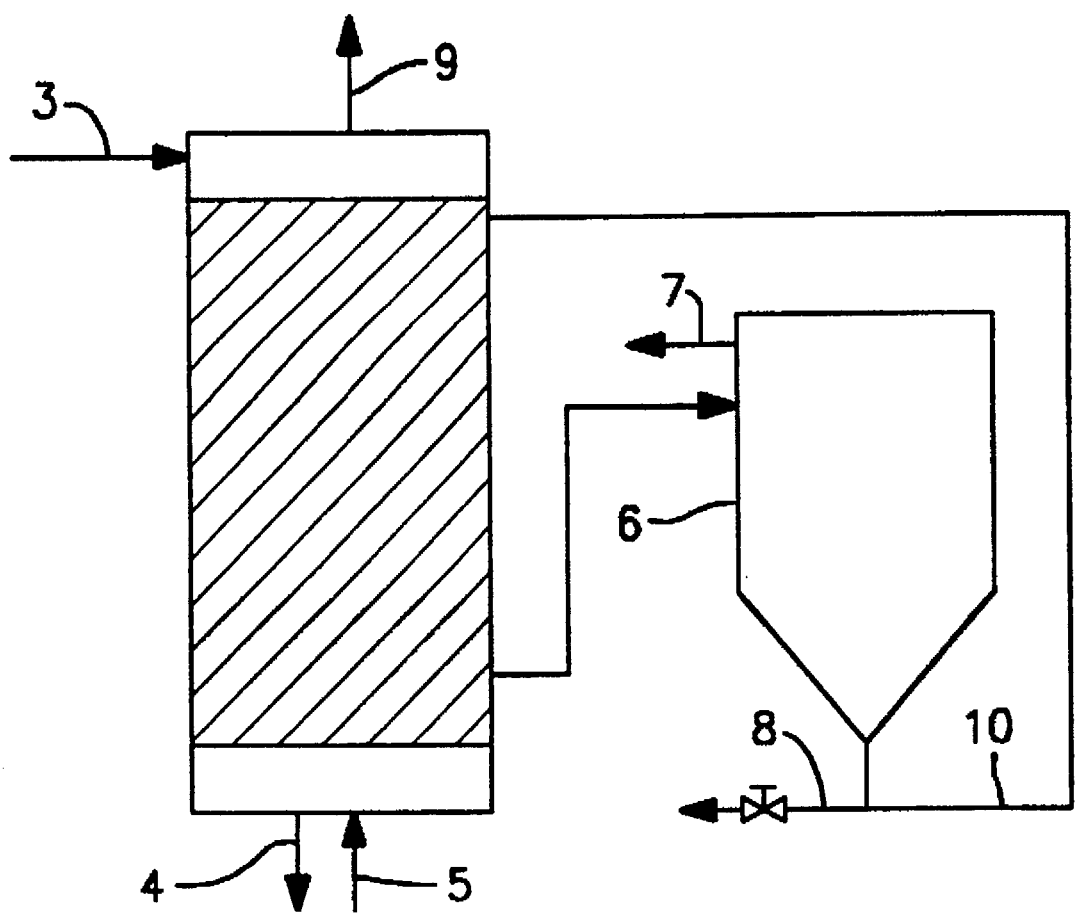
FIG. 4 depicts a fixed film reactor with an external settler.

The reactor according to FIG. 1 is divided vertically into two chambers (1) and (2), in which there is a rising flow and a downcoming flow, respectively. Waste water is supplied through line (3) and purified water is drawn off through line (4). Air is supplied through (5) and produces the vertical flow in the reactor. The sulphur is allowed to settle in settler (6) and to sink back to the reactor through openings in the bottom thereof. The clarified water can be drawn off through overflow (7) and line (4). Any surplus of sludge and/or sulphur can be removed through line (8). Used air is carried off through vent (9).

Another example of a reactor in which biomass and (a part of) the sulphur in the reactor are separated is a fluidized bed reactor. In such reactors, the settler is integrated in the aerobic reactor.

The reactor in which the oxidation of sulphide to sulphur is carried out is preferably a reactor in which a vertical circulation is maintained by means of an oxygen-containing gas flow. An airlift-loop reactor as depicted in FIG. 1 can also be used for this purpose. A reactor wherein a vertical circulation can be maintained by means of an oxygen-containing gas flow is known per se, for example from European patent application EP-A-24758.

It is also quite feasible, however as depicted in FIG. 4 where like reference numerals are used to designate like parts; to separate off the sulphur and optionally the biomass in a secondary settler (6) downstream of the reactor, and to recycle the separated material (10) wholly or partly to the reactor. Such an arrangement may be combined with a "fixed film reactor", wherein bacteria grow both on the fixed carrier material and on the sulphur aggregates.

Furthermore, it was found to be advantageous to use an increased sludge load in the anaerobic reactor, in particular a sulphide-volume reactor load of more than 100 mg/l.h, more in particular more than 200 mg/l.h. However, the sulphide load should not be too high, preferably is not higher than 1000 mg/l.h, in order to avoid an excessively concentrated sulphur solution and an excessively high effluent sulphide concentration. The sulphide concentration in the effluent should preferably be less than 50 mg/l, more preferably less than 20 mg/l.

The desired sulphide concentration can be adjusted by optional dilution of the influent with wholly or partly purified waste water. Fluctuating supply concentrations can be accommodated by adapting the recycling flow.

Bacteria that can be used according to the present invention belong to the group of colourless sulphur bacteria, including Thiobacillus, Thiomicrospira, Sulfolobus and Thermothrix.

It will be desirable in many cases to control the oxidation of sulphide to sulphur in such a way that, on the one hand, as little sulphur as possible remains in the effluent, and that, on the other hand, further oxidation to higher oxidized sulphur compounds is substantially reduced. The oxidation can be controlled by adjusting the oxygen supply or by adjusting the quantity of bacteria in the reactor. When the oxygen supply is used for controlling the reaction, preferably 0.5–1.5 mole of oxygen per mole of sulphide is fed into the reactor. When the quantity of bacterial mass is used for controlling the reaction, the ratio of sulphide to bacterial mass is preferably caused to be at least 10 mg $S^{2-}$ per mg of nitrogen in the bacterial mass, preferably at least 20 mg, and more preferably at least 30 mg $S^{2-}$/mg N.h. The oxygen concentration can be varied over a wide range and will preferably be within the range of 0.01–9.0 mg $O_2$ per liter of the material present in the reactor. More preferably, the oxygen concentration is within the range of 0.01–1.0 mg per liter. Preferably, air is used as oxygen-containing gas.

It has been found that a high concentration of sodium ions and other monovalent cations, such as other alkali metal ions, has an adverse effect on the settling tendency of the elemental sulphur, and consequently on its usefulness as a carrier material. Therefore provisions ere made so that the concentration of monovalent cations is below for example 0.25 mole/l during oxidation of sulphide to sulphur. Divalent and polyvalent cations, such as magnesium, were found to interfere less, if at all, with the flocculation of sulphur, so that such metal ions can advantageously be present. Further, the presence of divalent and polyvalent metal ions appears to counteract the adverse effect of monovalent ions and, as a result, the lower limit for the monovalent cations mentioned above may be higher if the waste water to be treated contains e.g. magnesium ions, preferably in a concentration or 1–100 mg/l.

The pH in the reactor should preferably not become higher than 9–5 in the process according to the invention. The lower limit of the pH is not critical; it may be below 5, since sulphide-oxidizing bacteria are known which grow at a pH as low as 0.5. In practice, a pH within the range of 7.5 to 9.0 is preferred.

When purifying waste water which contains a high concentration of sulphide, the oxidation can also be performed in two steps, wherein the controlled conditions are applied in the first step as described above, and remaining amounts of sulphide and sulphur are oxidized further, together with possibly present organic matter, in a post-treatment.

The process according to the invention can thus be used for purifying waste water or other water flows containing sulphide, or other sulphur compounds capable of being oxidized to elemental sulphur, such as mercaptans, thiophenols, dialkyl sulphides, disulphides, polysulphides, carbon disulphide and the like.

The present process can also be used as a part of the treatment of waste flows containing oxidized sulphur compounds, such as sulphate, sulphite, thiosulphate, sulphonic acids, sulphoxides and the like. The oxidised compounds can then first be reduced anaerobically, preferably biologically, to sulphide, which is subsequently converted to sulphur according to the process described above. In particular, sulphur- and sulphate-reducing bacteria (SRB), such as species of the genera Desulfovibrio, Desulfotomaculum, Desulfomonas, Thermodesulfobacterium, Desulfobulbus, Desulfobacter, Desulfococcus, Desulfonema, Desulfosarcina, Desulfobacterium and Desulfuromas can be used for the anaerobic step, i.e. the reduction of sulphur compounds to sulphide.

EXAMPLE I

In a mixed reactor having a capacity of 8 liters, sulphide-containing water (sulphide supply: 0.5 g/hour; sulphide load: 12 kg/m$^3$.day) was treated with sulphide-oxidizing bacteria in the presence of oxygen (2–4 mg/l) at pH 8, with a residence time of 10 hours. Sulphate was produced in a yield of a few percent while the remainder (>95%) of the product was elemental sulphur.

The concentration of elemental sulphur was varied from 700 mg/l to 6 g/l. It was found that an increased sulphur concentration results in a highly increased settling rate of sulphur. FIG. 2 shows the settling profile of a sample taken from the reactor as a function of the sulphur concentration.

EXAMPLE II

In an airlift-loop reactor (a vertical reactor with an air supply at the bottom and an internal settler at the top as depicted in FIG. 1) having a capacity of 2 liters, sulphide-containing water ( sulphide concentration 500 mg/l; sulphide load 12 kg/m$^3$.day) was treated with sulphide-oxidizing bacteria at pH 8 with a residence time of 1 hour. The concentration of elemental sulphur was kept between 2 and 4 g/l. As a result of the internal settler, more than 95% of the sulphur remained in the reactor. FIG. 3 shows the settling profile of a sample taken from this reactor (upper line) compared to a similar sample taken from a mixed reactor (lower line). It shows the more efficient separation of sulphur in the airlift-loop reactor, allowing this rector to be operated without additional carrier.

EXAMPLE III

In an airlift-loop reactor as shown in FIG. 1 having a capacity of 10 m$^3$, a sulphide-containing flow (sulphide concentration 300 mg/l; sulphide load 2.5 kg/m$^3$.day) was treated with sulphide-oxidizing bacteria at pH 8.5 with a residence time of 3⅓ hours. The concentration of elemental sulphur was kept above 3 g/l as a result of the operation of the internal settler. The oxygen concentration throughout the reactor was kept between 0.01 and 0.5 mg/l, fluctuating with the fluctuation of the sulphide load of the water supply. By controlling the supply of oxidation air, an efficiency of sulphide removal of more than 99% was achieved, while between 90 and 100% of the sulphide removed was converted to elemental sulphur.

I claim:

1. Process for purifying waste water containing sulphide, comprising:

oxidizing the sulphide in a reactor with sulphide-oxidizing bacteria in the presence of oxygen to elemental sulphur, separating from the waste water at least a part of the sulphur formed during oxidation, and recycling into the reactor a portion of the elemental sulphur separated from the waste water so as to maintain in the reactor an elemental sulphur concentration of at least 1 g/l.

2. Process according to claim 1, further comprising using sulphur aggregates as a carrier material for the sulphide-oxidizing bacteria.

3. Process according to claim 1, wherein the sulphur is separated from the reactor using an internal settler in the reactor.

4. Process according to claim 3, wherein the oxidation is carried out in a reactor wherein a vertical circulation is maintained by means of an oxygen-containing gas flow.

5. Process according to claim 1, wherein the sulphur is separated from liquid effluent using an external settler outside the reactor.

6. Process according to claim 5, wherein the bacteria are attached to a fixed film.

7. Process according to claim 1, wherein a concentration of elemental sulphur of at least 2 g/l is maintained in the reactor.

8. Process according to claim 1, wherein a concentration of elemental sulphur of at least 3 g/l is maintained in the reactor.

9. Process according to claim 1, wherein the sulphide volume load in the reactor is more than 200 mg/l.h.

10. Process according to claim 1, wherein the waste water contains cations, and at least a part of the cations present in the reactor are divalent or polyvalent metal ions.

11. Process for purifying waste water containing oxidized sulphur compounds selected from the group consisting of sulphate, sulphite, thiosulfate, sulfonic acids, and sulfoxides, which comprises:

treating the waste water with sulphate-reducing bacteria to obtain a sulphide containing water, oxidizing the sulphide in a reactor with sulphide-oxidizing bacteria in the presence of oxygen to elemental sulphur, separating from the waste water at least a part of the sulphur formed during oxidation, and recycling into the reactor a portion of the elemental sulphur separated from the waste water so as to maintain in the reactor an elemental sulphur concentration of at least one g/l.

* * * * *